Jan. 4, 1949. R. SARDESON ET AL 2,457,926
FILM LOADING DEVICE
Filed July 10, 1944 5 Sheets-Sheet 1

Inventors:
ROBERT SARDESON
EDWARD H. SAVELA
By Chas. C. Reif
Attorney.

Jan. 4, 1949. R. SARDESON ET AL 2,457,926
FILM LOADING DEVICE
Filed July 10, 1944 5 Sheets-Sheet 2

Inventors
ROBERT SARDESON
EDWARD H. SAVELA
By Chas. C. Reif
Attorney

Inventors:
ROBERT SARDESON
EDWARD H. SAVELA
By Chas. C. Reif
Attorney.

Jan. 4, 1949.  R. SARDESON ET AL  2,457,926
FILM LOADING DEVICE
Filed July 10, 1944  5 Sheets-Sheet 4

Inventors
ROBERT SARDESON
EDWARD H. SAVELA
By Chas. E. Reif
Attorney.

Patented Jan. 4, 1949

2,457,926

UNITED STATES PATENT OFFICE 2,457,926

FILM LOADING DEVICE

Robert Sardeson and Edward H. Savela, Minneapolis, Minn., assignors to Pako Corporation, Minneapolis, Minn., a corporation of Delaware Application July 10, 1944, Serial No. 544,278

18 Claims. (Cl. 95—100)

This invention relates to a film loading device and particularly to a device for loading or placing comparatively small cut films into a film hanger, which hanger has a plurality of means for gripping said films at spaced points about the edges thereof. It is desirable to have the films carried in a hanger for certain processing operations. Some of the larger films can be carried on hangers having film holding means comprising pins which pierce the films adjacent the corners thereof. With the smaller sizes of cut films it is not desired to pierce the edges and such films must be held in a hanger which has means for gripping the films. It will at once be seen that a great deal of labor would be involved in placing the small films in a hanger adapted to hold a plurality of said films if this operation were done by hand. Such a hand operation would be slow and tedious.

It is an object of this invention therefore, to provide a device by means of which a plurality of films may be quickly and easily loaded into a hanger, which hanger has gripping means for holding said films.

It is a further object of the invention to provide a device for loading films into a hanger, which hanger has a plurality of gripping means for gripping said films about the edges thereof comprising means for supporting a plurality of films in spaced relation and in position to be gripped by said hanger and means for supporting and moving said hanger relatively to said films to simultaneously position saids film in said gripping means.

It is another object of the invention to provide a device for loading a plurality of cut films into a hanger, which hanger has a plurality of gripping means for gripping said films at spaced points about the edges thereof, -each of said means comprising a pair of gripping members, which device comprises means for supporting said films in spaced flat position, means for supporting said hanger adjacent said films and substantially parallel to the plane of said films together with means for moving said hanger relatively to said films and relatively moving the members of each of said pairs so that said film is engaged by one of said members and brought into position between said members to be gripped thereby.

It is still another object of the invention to provide a loading device for placing a plurality of cut films into a hanger, which hanger has a plurality of gripping means for gripping said films at spaced points about the edges thereof, each of said means comprising a pair of gripping members resiliently urged into gripping relation which comprises means for supporting said films in spaced flat position with free projecting edge portions, means for supporting said hanger adjacent to and substantially parallel to the plane of said films together with means for moving said hanger and simultaneously relatively moving the members to all of said pairs to position the edge portions of said films between said members so as to be gripped thereby.

It is still further an object of the invention to provide a loading device for placing a plurality of cut films in a hanger having a plurality of gripping means each comprising a pair of members resiliently urged into gripping relation which comprises a base, a plurality of supports on said base for supporting said films in flat position, means on said base for supporting said hanger adjacent and substantially parallel to the plane of said films, a member movable to engage and exert pressure on said hanger and move the same toward said films together with means for engaging one of the members of each of said pairs and relatively moving the members of each of said pairs for moving one of the same past and flexing the edge of said film to position the edge of said film between the members whereby said films will be gripped by said members when pressure on said hanger is released.

It is more specifically an object of the invention to provide a device for loading or placing cut films into a hangar, which hanger has a plurality of gripping means for gripping said films at spaced points about the edges thereof, each of said gripping means comprising a pair of members resiliently urged into gripping relation, said device comprising a base, means on said base for supporting and positioning a plurality of films in flat horizontal positions, means on said base for supporting said hanger in position substantially parallel to the plane of said films, a frame pivotally mounted at one said of said base and movable downwardly into engagement with said hanger, means for causing further movement of said hanger in a horizontal position, abutment means on said base for engaging one of the members of each of said pairs whereby said members are separated as said hanger is moved downwardly and one of said members moves past the edge of each film flexing the same and causing said edge to snap into position between said members whereby when said frame is raised said films will be gripped by said members.

These and other objects and advantages of the invention will be fully set forth in the following description made in connection with the accompanying drawings in which reference characters refer to similar parts throughout the several views and in which:

Figures 1, 2, 3, 4:
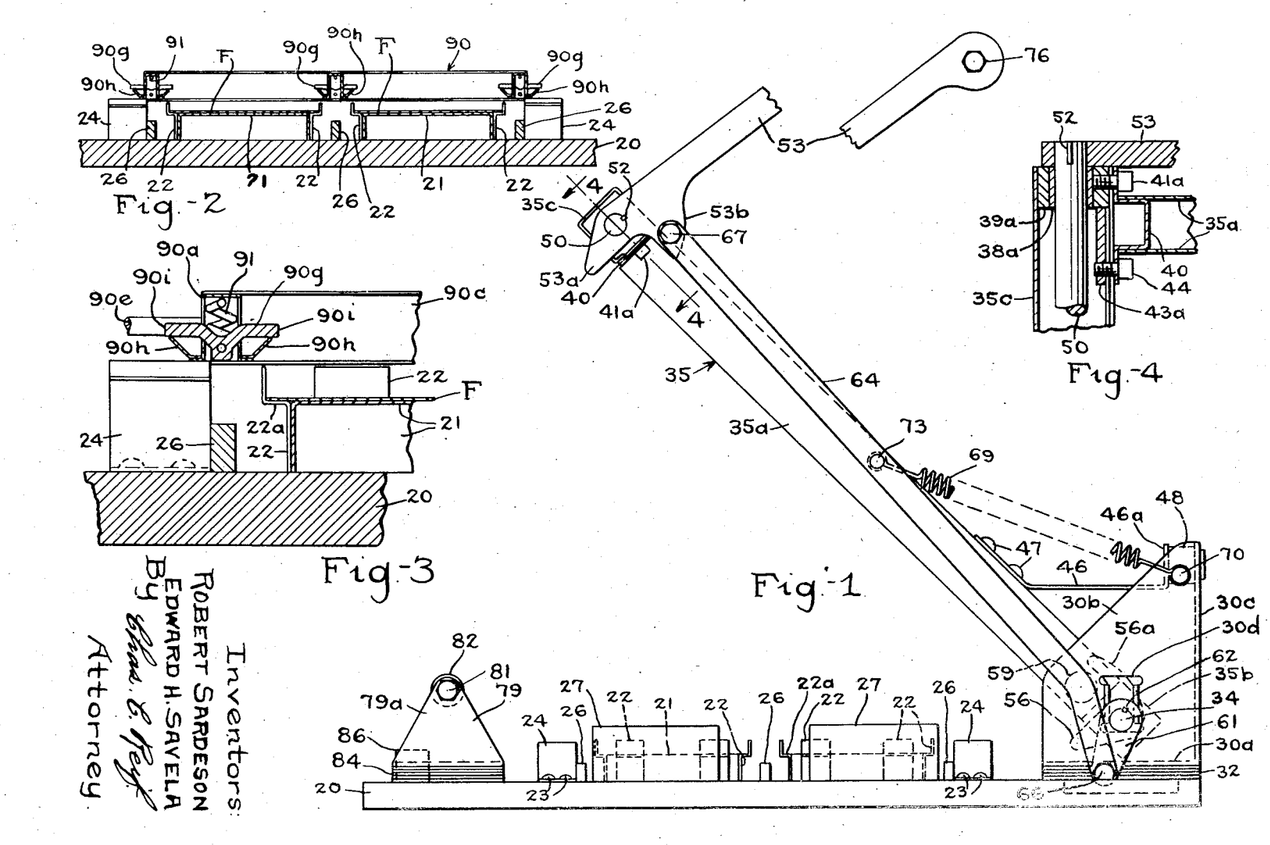
Fig. 1 is a view in side elevation of the device, a portion being broken away.
Fig. 2 is a vertical section taken on line 2—2 of Fig. 7.
Fig. 3 is a partial vertical section taken on line 3—3 of Fig. 7.
Fig. 4 is a partial horizontal section taken on line 4—4 of Fig. 1.
Figure 10:
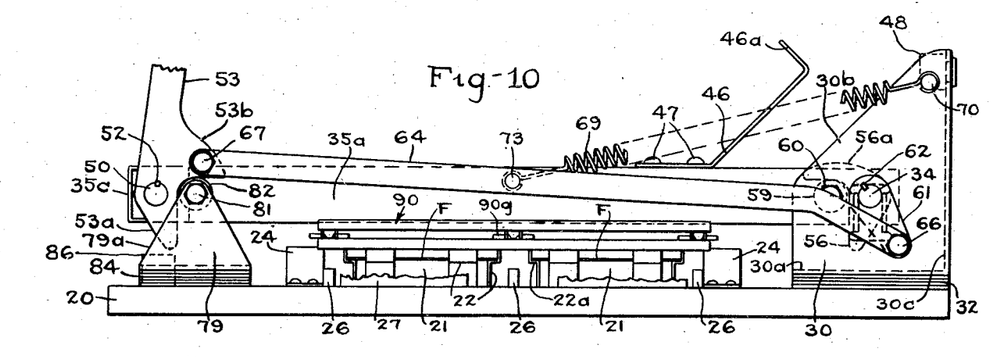
Fig. 10 is a view similar to Fig. 1 showing the parts in a different position of operation with the swinging frame moved down to engage the hanger.

Referring to the drawings a device is shown comprising a base member 20 and while this base member might be variously formed, in the embodiment of the invention illustrated it is shown as in the form of a board or plate and substantially rectangular in plan. Supported on and upstanding from base 20 are a plurality of film supporting members 21. While these members could be varied in form, they are shown as in the form of sheet metal boxes rectangular in horizontal cross section having flat tops and their open sides adjacent base 20. Secured to the sides of members 21 by spot welding or other suitable means are film locating or positioning members 22. Each of the members 22 as shown in Figs. 1 and 10, comprises a plate of small width having a vertical portion substantially perpendicular to base 20 and secured against a side of a member 21, a horizontal portion 22a having its top substantially flush with the top of member 21 and a second terminal vertical portion substantially perpendicular to base 20. In the embodiment of the invention illustrated there are four of the members 21 and there are two members 22 at each side of each member 21. Each of said members 21 forms a supporting means for a film, which film is also partly supported on the horizontal portions 22a which extend outwardly from members 21 as clearly seen in Figs. 1 and 14. The vertical terminal portions of members 22 act as film positioning or locating means. Also supported by and secured to base 20 by the screws 23 are the hanger supporting members 24. These members are in the form of plate springs, there being two of them at each end of the members 21, the same having free ends which project inwardly or towards each other in the two pairs of said members. Members 24 form supports for the hanger used when it is placed in the device. Also secured to and upstanding from base 20 are a plurality of transversely extending members or bars 26 and in the embodiment of the invention illustrated three of the same are shown. One of these members 26 is disposed between the pairs of members 21 while the other members 26 are disposed at the remote ends of said members 21.

Figures 5, 6:
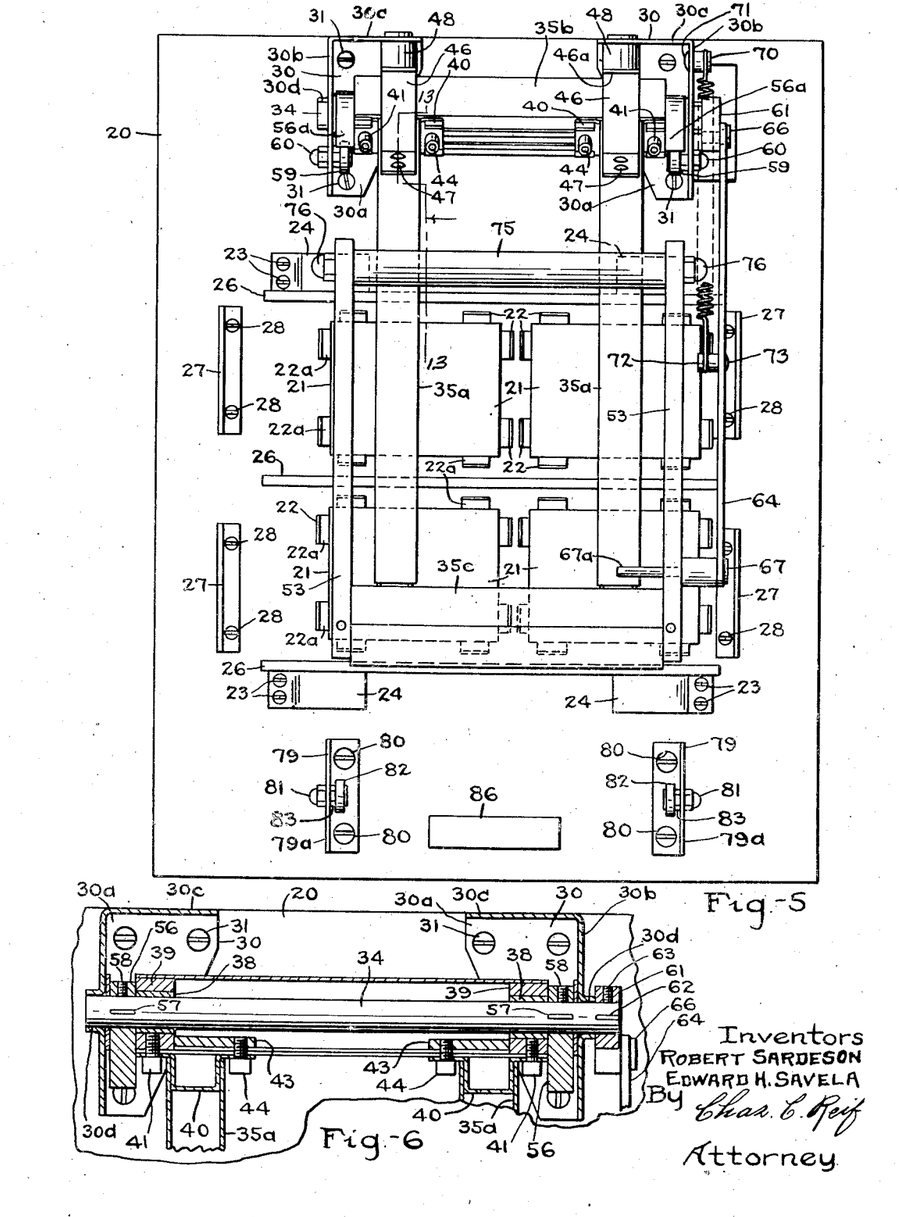
Fig. 5 is a plan view of the device.
Fig. 6 is a horizontal section taken substantially on line 6—6 of Fig. 13.
Figure 12:
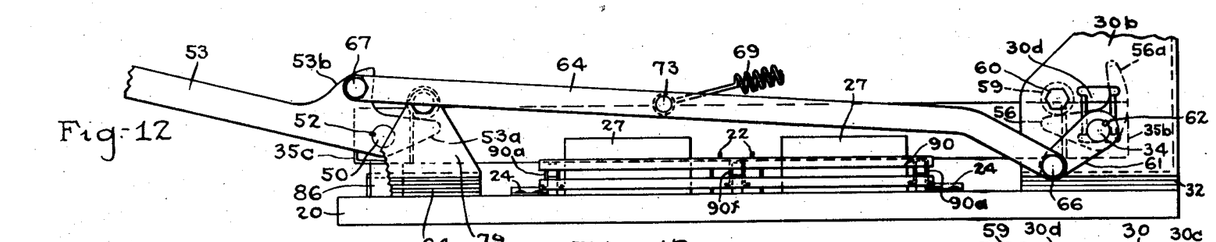
Fig. 12 is a partial view similar to Fig. 11 showing the final or lowest position of the hanger and swinging frame.

Pairs of members 27 are disposed at each side of base 20, the same having narrow horizontal portions or flanges secured to said base by screws 28 and having vertically extending portions, the terminal ends of which are bent to project inwardly slightly. Members 27 are in spaced relation at each side of base 20 as clearly shown in Fig. 4. Adjacent one end of base 20 are spaced brackets 30 and while these could be variously formed, in the embodiment of the invention illustrated each comprises a flat horizontal portion 30a secured to base 20 by spaced screws 31. Said horizontal portion 30a is disposed some distance above the top of base 20 and supported on a plurality of spacing plates or shims 32. Each bracket has a side portion or plate 30b and an end plate 30c, said side plates 30b being disposed at the remote sides of said brackets and said end plates 30c being disposed substantially at the end of base member 20. The side portions of brackets 30 have vertically extending slots 30d formed therein. A shaft 34 extends transversely of base 20 some distance above the bottoms of brackets 30 and the same extends through slots 30d. A swinging frame 35 is provided comprising spaced longitudinally extending members 35a which are illustrated as made of sheet metal and rectangular or substantially square in transverse cross section with open slots at their lower sides. Frame 35 has a rear end member 35b. Said end member 35b is shown in transverse section in Fig. 13 and at its forward side its terminal portions are shown as slightly offset forwardly and having their edges in spaced relation. Blocks 39 fit into the ends of end member 35b and are bored to receive bushings 38 in which shaft 34 is journaled. (See Fig. 6.) Members 40 are provided having forwardly projecting portions fitting into the rear ends of side members 35a to which they are connected in any suitable manner as by welding. Members 40 have side flanges, the outer ones of which are connected to the blocks 39 by the headed screws 41. It will be seen that the front side of end member 35b is clamped between said flanges and the blocks 39. The inner flanges of members 40 are connected to plates 43 extending from top to bottom of end member 35b as shown in Fig. 12. The front portion of side member 35b is also clamped between said inner flanges and the plates 43. A front end member 35c is provided similar in construction to the rear member 35b and has blocks 39a at its ends similar to the blocks 39. Blocks 39a are bored to receive bushings 38a. Front members 40 are provided similar to members 40 already described, over which the front ends of the side members 35a fit and to which they are connected by welding. The outer flanges of front members 40 are secured to the blocks 39a by screws 41a and the inner flanges of front members 40 are secured by screws 44 to plates 43a similar to plates 43 and which extend from top to bottom of front member 35c. A bracket 46 is secured to the top of each member 35a by the headed screws 47, which brackets extend rearwardly and have terminal portions 46a bent upwardly at right angles. The brackets 30 have their upper rear plate portions apertured to receive blocks 48 of resilient material which act as bumpers to be engaged by portions 46a.

A shaft 50 extends transversely through the end member 35c of frame 35 being journaled in bushings 38a and the same has secured to the ends thereof in any suitable manner as by keys 52 levers 53. Levers 53 have downwardly projecting portions 53a at their lower ends, having cam surfaces on their upper sides which extend in a continuous curve to the inner surfaces of other projections 53b of said levers. Secured to shaft 34 which as stated, is at the rear of frame 35, are cam members 56. Said members are secured by keys 57 and screws 58 are additionally provided. Cam members 56 are constructed and arranged to cooperate with rollers 59 carried on headed studs 60 secured in side portions or plates 30b of brackets 30. Members 56 have cam surfaces on their upper sides which extend in a curve to the surfaces of projections 56a of said members. Also secured to shaft 34 at one end thereof at the outer side of one bracket 30 is a link 61. The link 61 is secured to shaft 34 by a key 62 and a securing screw 63 is also provided. Secured to the end of link 61 by the headed stud 66 is a long link 64, the other end of which is secured to the lug 53b on lever 53 by a headed stud 67. Stud 67 has an inwardly projecting pin-like portion 67a which is adapted to overlie one of the side members 35a and act as a stop in the movement of frame 35. A tensile coiled spring 69 has one end secured to a block 740 secured to the side plate of one bracket 30 by a headed stud 71. The other end of spring 69 is secured to a block 72 secured to the inner side of link 64 by the headed stud 73. It will be seen that spring 69 tends to swing frame 35 and levers 53 as well as the link 64 upwardly as shown in Fig. 1. This movement is limited by engagement of bracket portions 46a with the abutments 48. The levers 53 are connected at their upper ends by a transversely extending member 75 preferably in the form of a tube, the same having members adjacent its ends secured to the levers 53 by the headed studs 76. Brackets 79 are secured adjacent the front of base 20, the same being shown as formed of sheet material having horizontal portions secured to said base by spaced screws 80 and having vertical portions 79a in which are secured headed studs 81 carrying at their inner ends rollers 82. Rollers 82 are spaced some distance from the inner side of brackets 79 by the nuts 83. The bottom horizontal portions of brackets 79 are spaced somewhat above base 20 and a plurality of spacing plates or shims 84 are disposed between the lower side of said brackets and the top of base 20. A stop member 86 is secured to the front portion of base 20 and shown as in the form of a block rectangular in horizontal and vertical cross section.

Figures 13, 14, 15, 16, 17:
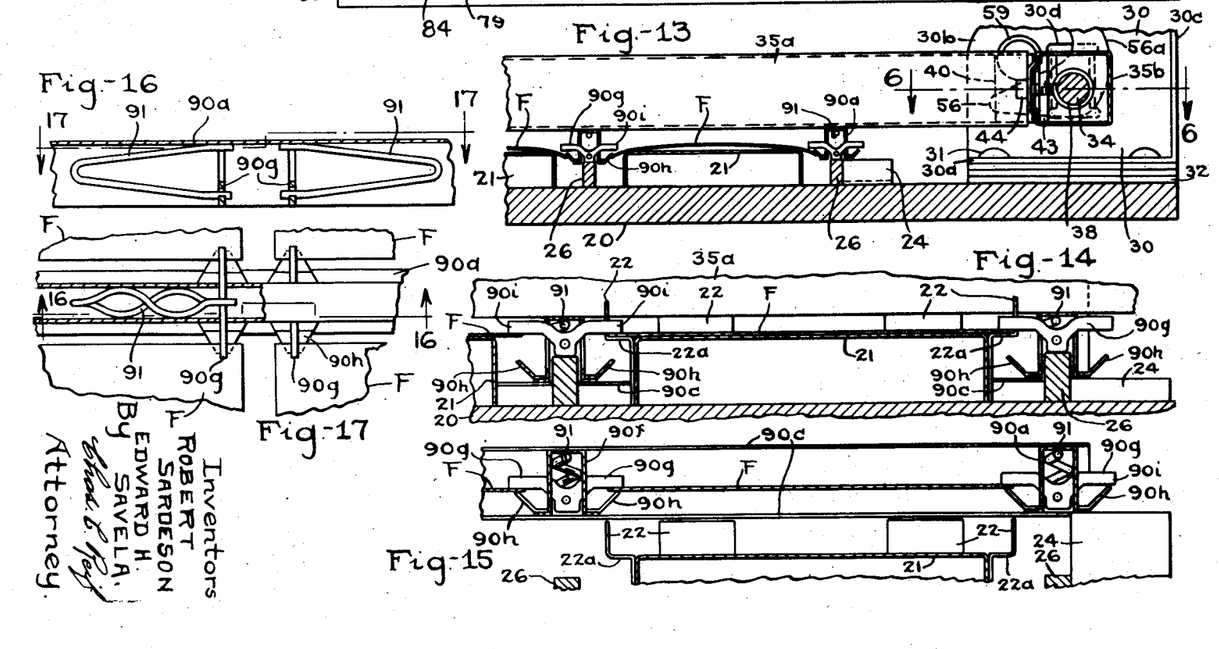
Fig. 13 is a partial vertical section taken substantially on line 13—13 of Fig. 5 with some parts omitted.
Fig. 14 is a partial vertical section taken substantially on line 2—2 of Fig. 7 shown on an enlarged scale.
Fig. 15 is a partial vertical section similar to Fig. 14 showing the parts in different positions.
Fig. 16 is a vertical section taken substantially on line 15—16 of Fig. 17.
Fig. 17 is a view partly in plan and partly in horizontal section substantially on line 17—17 of Fig. 16.

The device is constructed and arranged to load films on to a film hanger. This hanger 90 is of special construction and is shown in the drawings. The same comprises longitudinally extending side members 90a connected at their lower ends by the upper and lower plates 90b having terminal portions bent to converge toward each other but having spaced free edges. The side members 90a are in the form of channels having flat tops and downwardly extending parallel sides, said channels being open at their lower sides. At their top ends side members 90a are connected by upper and lower plates 90c which are bent to converge toward each other at the tops of side members 90a and are connected to a substantially U-shaped rod 90d, the ends of which are connected to a transverse supporting bar or rod 90e, the ends of which project beyond member 90d. The hanger 90 also has a central member 90f extending between portions 90b and 90c and similar to the side portions 90a. The hanger comprises a plurality of gripping means adapted to grip the films held therein at spaced points about the edges of said films. These gripping means are shown as comprising a top member 90g and a lower gripping member 90h. Members 90g and 90h are urged into gripping relation by the bow springs 91 disposed in the side members 90a and central member 90f, said springs as shown in Fig. 15, having free ends, one of which engages the top portion of member 90a on its underside and the other end of which is recessed to engage the central portion of member 90g. Member 90g is provided with an aperture through which the end of spring 91 extends. As clearly shown in Figs. 6 to 14, member 90g has projecting side portions 90i. These project through slots in the sides of side members 90a and are guided vertically therein. The central portion of members 90g is disposed in the side member 90a and has a lower flat surface. Members 90h extend outwardly from the sides of side members 90a, the same having portions secured to short flanges bent outwardly from said side members and also have portions extending upwardly and away from the sides of side members 90a and in vertical alignment with the projecting portions of upper gripping members 90g. The shapes in plan of lower gripping members 90h are trapezoidal as shown clearly in Figs. 6, 8 and 16. As clearly shown in Figs. 12 and 13, the lower ends of the gripping members 90g, which are disposed in the side members 90a, are in vertical alignment with the bars 26 extending transversely of base member 20.

Figure 7:
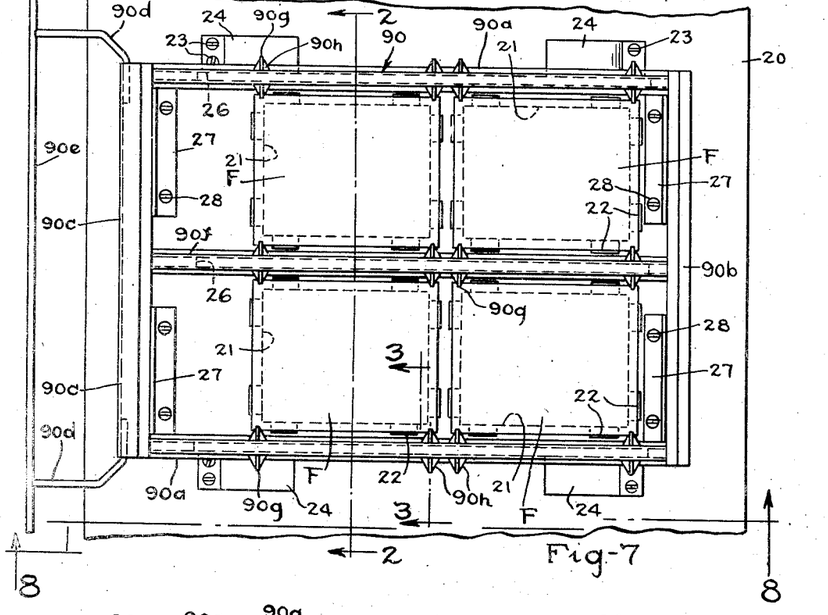
Fig. 7 is a plan view of the device in one stage of operation.
Figures 8, 9:
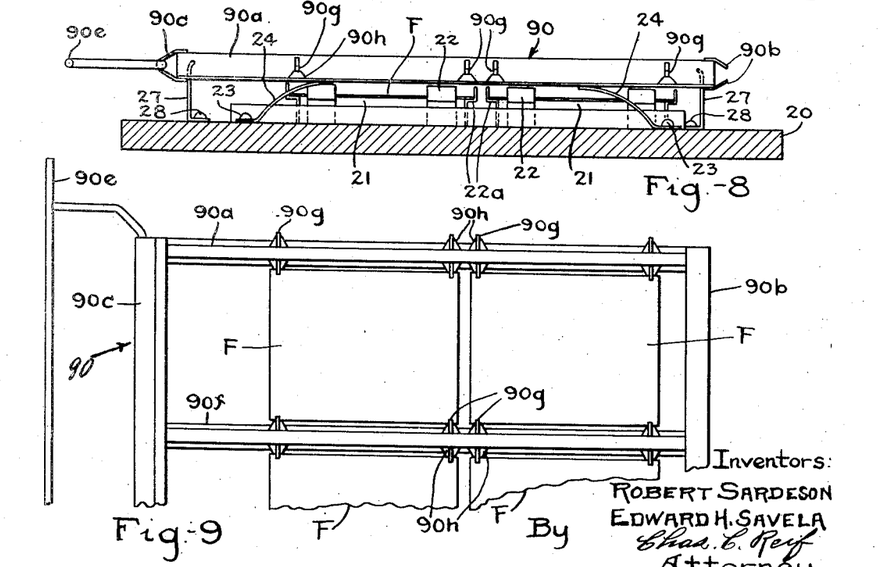
Fig. 8 is a vertical section taken substantially on line 8—8 of Fig. 7 as indicated by the arrows.
Fig. 9 is a partial view of the hanger removed from the device showing the films secured therein.
Figure 11:
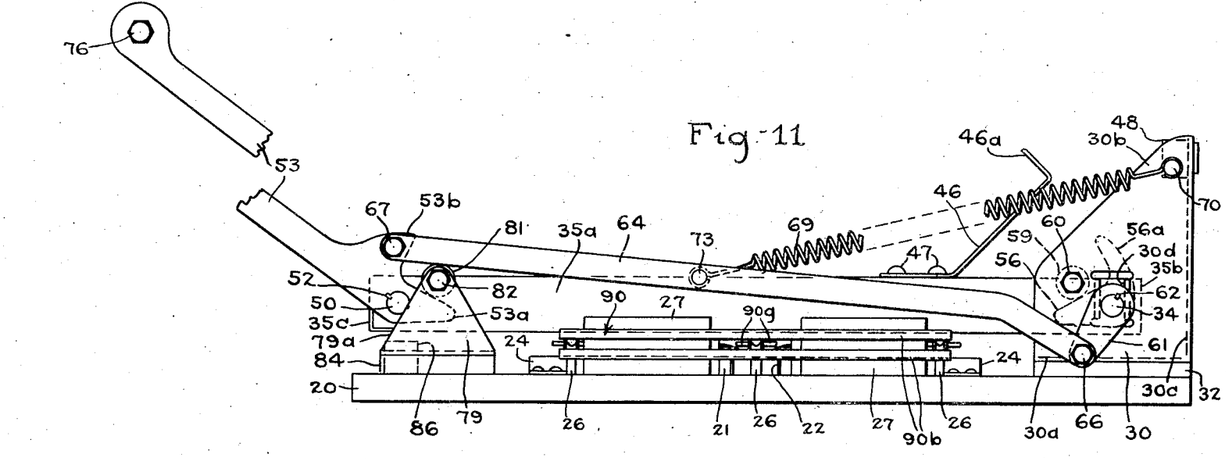
Fig. 11 is a partial view similar to Fig. 10 showing the hanger moved downwardly by the swinging frame.

In operation the films to be loaded are placed by the operator on top of the members 21 and are guided into and held in proper position by the members 22. This position of the films F is clearly shown in Figs. 7 and 13 to 15 inclusive. It will be seen as clearly shown in Figs. 12 and 13, that the edge portions of the films F project beyond members 21. The films can be easily and quickly placed in position. When the films are thus placed in position the hanger 90 is placed in the device. At this time the frame 35 and parts carried thereby will be in the raised position shown in Fig. 1. The hanger is placed in position and is supported on the springs 24. Said hanger is guided into proper position and held in such position by the members 27 at each side of base 20. The members 27 extend upward through the hanger close to the end members 90b and 90c as clearly shown in Figs. 7 and 8. The hanger is placed in the device extending transversely or crosswise to base 20 as clearly shown in Figs. 7 and 8. The hanger is supported on the spring supports 24. When the hanger is thus in position the frame 35 is swung downwardly. This can be done by the operator taking hold of end member 35c or he can take hold of the bar or rod 75 connecting the upper ends of levers 53. Frame 35 thus moves downwardly, moving about the axis of shaft 34. When the frame approaches horizontal position the cam members formed by projections 53a on levers 53 and members 56 secured to shaft 34 engage their respective rollers 82 and 59. This position of the parts is shown in Fig. 10. The operator now takes hold of the rod or bar connecting levers 53 and swings said levers downwardly. If rod 75 was grasped and moved downwardly this movement is merely continued. The cam portions 53a on the levers move under the rollers 82 as shown in Fig. 9, and the rear cam members 56 move under the rollers 59. The rollers 82 and 59 are at the same level and shafts 34 and 50 are at substantially the center of frame 35 from top to bottom. The frame 35 including its side members 35a, is thus moved downwardly in a horizontal position from the time it engages hanger 90. In other words, the bottom of said frame 35 is always in a horizontal plane. When the hanger 90 was placed in the device as above stated, the bottom central portions of upper gripping members 90g come into alignment with the tranverse bars 26. As the hanger is moved downwardly springs 24 flex to permit this and the outwardly projecting portions of lower gripping members 90h engage the edge portions of the films as shown in Fig. 13. The bottoms of upper gripping members 90g engage the bars 26 respectively as shown in Fig. 13, and further downward movement or depression of the hanger flexes the springs 91 and separates gripping members 90g and 90h substantially to the position shown in Fig. 13. As the said gripping members separate the projecting portions of lower gripping members 90h depress the edges of the films and finally move past said edges. When members 90h thus move past the edges of said films the edge portions of the films snap back or upwardly into the position shown in Fig. 14. Said edge portions then are substantially in engagement with the lower sides of upper members 90g and are disposed between gripping members 90g and 90h. Since the edge portions of the films at each side of the device project inwardly at their inner edges or at the central portion of the hanger, the lower gripping members 90h in central portion 90f engage the edge portions of two or more films. The levers 53 can be moved downwardly until the front cross member 35c engages the top of stop 86. The operator now releases levers 53 and frame 35 with said levers is quickly moved to its upper position by spring 69 and bracket portions 46a are brought into engagement with the bumpers 48. The projecting portions 67a of stud 67 engages the top of one side member 35a and thus determines the relative positions of levers 53 and frame 35 when frame 35 is in its upper position. When the frame 35 moves upwardly pressure on the hanger is released and the springs 91 move the gripping members 90g and 90h into gripping position as shown in Fig. 15 so that the films are firmly gripped by said gripping members at spaced points about their edges. In Fig. 10 the frame 35 is shown as moved down to horizontal position to engage the top of hanger 90. Cams 53a and 56 are now substantially vertical at the sides of rollers 82 and 59 respectively. In Fig. 11 levers 53 have been swung downwardly and said cams have moved under their respective rollers causing frame 35 to move downwardly while maintaining a horizontal position and depressing hanger 90 in a like horizontal position. In Fig. 12 frame 35 and hanger 90 are in their lowest position with front end member engaging stop block 86. In Fig. 15 the edge portions of the films are shown engaged by members 90h and 90i after frame 35 has been moved upwardly. When frame 35 is moved to its upper position the operator can lift the hanger 90 from the device and the films are securely held and disposed in said hanger. The hanger can now be taken to the desired place or placed in the desired machine for processing the films.

From the above description it will be seen that we have provided a comparatively simple and highly efficient device for loading cut films into a hanger. The operation is very rapid. The films as stated, can be quickly and easily placed on the film supports and the movement of frame 35 and the levers 53 can be made very quickly. The members 22 form convenient means for positioning the films and the upwardly extending terminal portions of said films of said members make it easy for an operator to place the films on the film supports even in the dark. The machine will ordinarily be operated in a dark room. The machine is sturdy and compact and there are no loose parts. The plates or shims are provided beneath the brackets 35 and 79 so that the rollers carried by said brackets can be very accurately positioned in relation to the film supports. The device has been amply demonstrated in actual practice, found to be very successful and efficient and is being commercially made.

It will, of course, be understood that various changes may be made in the form, details, arrangement and proportions of the parts, without departing from the scope of applicant's invention, which generally stated, consists in a device capable of carying out the objects above set forth, in the parts and combinations of parts disclosed and defined in the appended claims.

What is claimed is:

1. A loading device for placing films in a film hanger, which hanger has a plurality of gripping means each comprising pairs of gripping members resiliently urged into position for gripping said films at spaced points about their edges having in combination, a base, a plurality of spaced supports on said base adapted to have films laid thereon respectively with their flat sides engaging said supports, the edge portions of said films overhanging the edges of said supports respectively, resilient means on said base on which said hanger is placed in position substantially parallel to and above the plane of said films and adjacent said films, abutment members on said base arranged to engage one of the members of each of said pairs, means movable toward said films and hanger and engaging said hanger constructed and arranged to exert pressure on said hanger and move the same parallel to said films to relatively move said members of each pair and separate the members of each of said pairs and to engage flex and move one of said members of each pair nearer said film, against, and past the edge portions of said films respectively, to cause said edge portions to be bent about said edges of said supports respectively and to be released and to snap back and be positioned between said members respectively so that said members will grip said films when said pressure is released by reverse movement of said third mentioned means.

2. A device for loading films onto a hanger, which hanger has a plurality of gripping means for gripping said films at spaced points about the edges thereof, each of said means including a pair of gripping members and resilient means urging said members into gripping relation having in combination, supports adapted to have a plurality of films placed flat thereon in spaced relation to be gripped by said gripping means said films projecting beyond the edges of said supports respectively, means for supporting a hanger substantially parallel to the plane of said films, means engaging one of the members of each of said pairs, means for moving said hanger toward said last mentioned means to separate the members of each of said pairs and move the one of the same nearer said film against and past the edge portions of said films resting on said supports respectively to flex said edge portions about the edges of said supports respectively and to move past said edge portions and cause the same to snap back against the other member of each pair whereby said edge portions move between the members of said pairs respectively to be gripped by said members when subsequently urged together by said resilient means.

3. A loading device for loading cut films onto a hanger having in combination, means engaging one of the flat sides of each of a plurality of spaced films respectively and of less area than the surface of each of said films so that said films project beyond the edges of said means respectively, means for moving the one of a pair of gripping members nearer said film past the edge portion of each of said films to flex the same about the edges of said first mentioned means and release it to cause it to spring back to original position disposed between said one member and the other member, which latter member is at the opposite side thereof.

4. A film loading device having in combination, a base, a plurality of means on said base for supporting films in flat substantially horizontal position and in spaced relation with the edge portions of said films projecting beyond the edges of said means respectively, said supports each having means for positioning a film thereon, means for supporting a hanger adjacent said films and substantially parallel thereto, said hanger having a plurality of film-gripping means each comprising a pair of gripping members resiliently urged into gripping relation, and means for relatively moving said hanger and films toward each other and means engaging said hanger for separating said gripping members and moving the one of said gripping members of each pair nearer said film against the edge portion of said film to flex the same about the edge of said first mentioned means and releasing the same to position the edge portion between said gripping members to be gripped thereby.

5. A film loading device having in combination, a base, a plurality of spaced members upstanding from said base having surfaces for supporting said films in flat position with certain of their edge portions projecting beyond the edges of said surfaces, means at the sides of said supports for locating said films thereon, means for supporting a hanger substantially parallel to the plane of said films, which hanger has a plurality of film-gripping means thereon each comprising a pair of gripping members resiliently urged into gripping relation and means movable toward said hanger and films for relatively moving said hanger and films toward each other, means engaging said hanger to separate said members of each of said pairs and move the one of the same nearer said film relatively to the projecting portion of the film to flex the same about said edge and release the same to position said edge portion between said members.

6. A film loading device having in combination, a base, a plurality of spaced film supports thereon, means for supporting a hanger about films on said supports, said hanger having a plurality of film gripping members with resilient means urging said members into gripping relation, a frame pivoted at one side of said base, rollers mounted above said base at each side of and adjacent each end of said frame, said rollers being in the same horizontal plane, cams pivoted to said frame for engaging said rollers and means for swinging said cams to engage and move along said rollers when said frame engages said hanger for moving said frame downwardly while maintained in horizontal position for moving said hanger downwardly.

7. The structure set forth in claim 6, said means comprising levers pivoted adjacent the free end of said frame, said levers carrying one pair of said cams and links connecting said levers to the other pair of said cams.

8. A film loading device having in combination, a base, a plurality of spaced supports on said base having surfaces for supporting films in flat position thereon, means for supporting a hanger above said films, said hanger having parallel bars with film-gripping means thereon each comprising a pair of gripping members projecting at the sides of said bars with resilient means for moving said members into gripping relation, a stationary means on said base aligned with one of the members of each of said pairs, a frame swingingly mounted on said base for engaging the top of said hanger and pressing the same downwardly against said last mentioned means for separating the members of each of said pairs against the pressure of said resilient means and engaging said films respectively by the other of said members of each of said pairs to position the edge portions of said films between said member whereby when said frame is raised said members will be moved into gripping relation to said films by said resilient means.

9. A film loading device having in combination, a base, a plurality of spaced film supports on said base having surfaces for supporting films respectively, the edge portions of said films projecting beyond said supports, bars on said base extending along the sides of said film supports, movable means on said base for supporting a hanger above said films, said hanger having spaced channels open at their lower sides and having a plurality of pairs of film gripping members projecting from the sides of said channels, springs in said channels urging said members into gripping relation, the edge portions of said films being in vertical alinement with said members, one of the members of each of said pairs being aligned with and adapted to be engaged by one of said bars, means for pressing said hanger downwardly against said bars whereby said springs are flexed and said members are separated and the edge portions of said films are engaged by one of said members of each pair respectively and are positioned between said members.

10. A film loading device having in combination, a base, a plurality of spaced film supports on said base, movable means on said base for supporting a hanger above and substantially parallel to films on said supports, a frame substantially rectangular in plan, spaced brackets at each side of said base adjacent one end thereof, a shaft mounted in said brackets and movable vertically therein about which said frame is pivoted adjacent one end, said shaft being carried in said frame rollers carried by said brackets above said base, a second pair of spaced brackets spaced forwardly from said first mentioned brackets, rollers carried in said second pair of brackets, all of said rollers being at the same distance from the top of said base and having their axes stationary, cams carried on said shaft adapted to be swung to move under said first mentioned rollers, cams at the front of said frame adapted to be swung to move under said last mentioned rollers and means for swinging all of said cams in unison to move said frame and hanger downwardly while maintained in horizontal position.

11. The structure set forth in claim 10, said means comprising levers pivoted adjacent the free end of said frame connected to said last mentioned cams and links connecting said levers to said first mentioned cams.

12. The structure set forth in claim 10, and means whereby said brackets may be positioned at different heights above said base.

13. A loading device having in combination, a base, a plurality of means on said base adapted to have films rest thereon on their flat sides with their edge portions projecting therefrom, means on said base for supporting a film hanger about said films, said hanger having a plurality of gripping means thereon, each comprising a pair of members urged into gripping relation by resilient means, a swinging frame pivotally mounted on said base swingable into engagement with said hanger, means for moving said frame to press on and move said hanger downwardly parallel to the plane of said films, abutment means engaging one of the members of each of said pairs as said hanger is moved downwardly to hold the same stationary, the movement of said hanger moving the other member of each pair away from said one member, said other member engaging the edge portion of the adjacent film, flexing the same and moving past said edge portion thereof whereby said portion springs back to normal position and is positioned between the members of said pair on all of said films respectively and said members are moved together by said resilient means when said swinging member is raised.

14. A device for loading films into a hanger having in combination, a base, a plurality of supports thereon having surfaces adapted to have said films respectively lie thereon in flat position, said surfaces being of smaller area than said films whereby certain edge portions of said films project beyond said surfaces, movable means on said base for receiving and supporting a hanger, said hanger having a plurality of pairs of superposed gripping members disposed about said films in gripping relation thereto and above the edge portions thereof, resilient means holding said members in gripping relation, one of said members of each of said pairs having a projection at the lower side of said hanger, rigid means on said base adapted to be engaged by said projections respectively, said members being separable by downward movement of said hanger toward said projections, and means for engaging and moving said hanger downwardly for moving the member of each pair nearer said film to depress said edge portions and move past the same whereby said film snaps back and comes into position between said members, said resilient means acting to close said members on said film when said last mentioned means is raised.

15. A device for securing a film in a hanger, which hanger has a pair of gripping members adapted to grip the edge portion of said film therebetween, having in combination, means for supporting the central portion of a film with the edge portion thereof projecting beyond the edge of said means, means for positioning said hanger with said members at one side of said edge portion and one above the other, means for moving the member nearer said film against said edge portion to flex the same about said edge and past said edge portion to release the same whereby said edge portion springs back and comes into position between said members and means for moving said members together to grip said film.

16. A loader for loading a plurality of films into a hanger, which hanger has a plurality of gripping means each comprising a pair of members and resilient means urging said members into gripping relation having in combination, supports for said films of less area than said films respectively whereby the edge portions of said films project beyond the edges of said supports respectively, means for supporting a hanger adjacent said films at one side thereof, means for exerting pressure on said hanger and moving it toward said films and against said third mentioned means to press on the one of said members of each pair farther from its adjacent film and separate said members against the pressure of said resilient means and to move the one of said members of each of said pairs nearer its adjacent film against the edge portion of said film and bend it about the edge of said support and then to move past and release said edge portion so that it snaps back against said first mentioned member and is positioned between said members whereby when pressure on said hanger is released it is moved in the opposite direction by said resilient means and said members are moved to grip said film.

17. A loading device for placing films in a film hanger, which hanger has a plurality of gripping means each comprising pairs of gripping members for gripping said films at spaced points thereabout having in combination, means having surfaces engaging a plurality of films disposed in flat spaced relation with said films projecting beyond the edges of said surfaces, means for supporting said hanger in a plane substantially parallel to the plane of said films with said gripping means at one side of and adjacent the edge portions of said films, and means movable toward said films and hanger and moving said hanger for separating the members of said pairs of gripping means and moving the one of said members of each pair nearer its adjacent film against the edge portion of said film to flex the same about the edge of said surface, move past the same and release said edge portion so that it snaps back between said members.

18. A loading device for placing films in a film hanger, which hanger has a plurality of gripping means each comprising pairs of gripping members resiliently urged into gripping position for gripping said films at spaced points thereabout having in combination, a plurality of surfaces arranged to engage the flat sides of said films in spaced relation with said films projecting beyond the edges of said surfaces respectively, means for supporting said hanger adjacent said films and in a plane substantially parallel to the plane of said films, means movable toward said hanger and films for engaging and exerting pressure on said hanger and moving the same toward said films, said second mentioned means having portions engaging one of the members of each of said pairs and acting with said last mentioned means to separate the members of each of said pairs as said hanger is moved to cause the one of said members of each pair nearer the adjacent film to engage the edge portion of said film to bend the same about the edge of said surface and to move past and release said edge portion so that the same springs back against the other of said members and is positioned between said members whereby said films are gripped by said members when pressure on said hanger is released.

ROBERT SARDESON.
EDWARD H. SAVELA.

REFERENCES CITED

The following references are of record in the file of this patent:

UNITED STATES PATENTS

| Number | Name | Date |
| --- | --- | --- |
| 1,113,288 | Barnes et al. | Oct. 13, 1914 |
| 1,237,563 | Schoenberg | Aug. 21, 1917 |
| 1,365,975 | Folmer | Jan. 18, 1921 |
| 1,778,140 | Becker | Oct. 14, 1930 |
| 2,223,858 | Schellenberg | Dec. 3, 1940 |